March 3, 1959 J. ENDRES 2,875,576
JET PROPULSION AND LIKE POWER PLANT
Filed Jan. 29, 1954
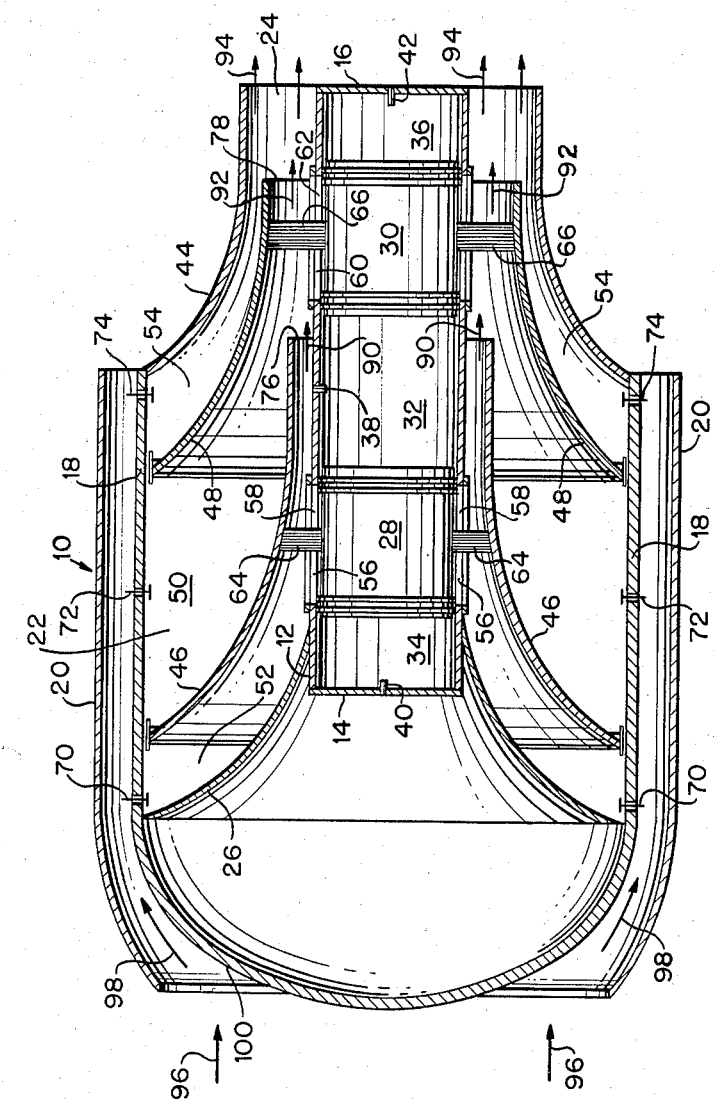
INVENTOR.
JOHANN ENDRES
BY *Leon M. Strauss*
AGT.

United States Patent Office 2,875,576
Patented Mar. 3, 1959

2,875,576

JET PROPULSION AND LIKE POWER PLANT

Johann Endres, Wackersberg, near Bad Tolz, Germany

Application January 29, 1954, Serial No. 407,136

1 Claim. (Cl. 60—35.6)

This invention relates to internal combustion engine and more particularly to a novel jet engine wherein a compressor unit is coaxial with and surrounds a free piston type engine unit.

An important object of the present invention resides in the provision of means for facilitating the cooling of an internal combustion free-piston type engine unit by the very air that is used for providing the propulsive thrust of a jet engine.

A further object of the invention resides in the provision of a jet engine arrangement which is extremely compact and which is highly efficient in operation.

In German Patent No. 734,602 of April 20, 1943 there is disclosed a jet propulsion unit for aircraft which is of the double-flow free-piston type and creates a thrust according to the momentum thereon. The propulsion plant of this patent utilizes a two-stroke internal combustion engine arrangement, in which the gas pressure during the first stroke acts partially on several compressor pistons in nozzle shape, which enables a similar compression and acceleration process to take place during the return stroke.

The creation of a propulsive jet or the compression of air necessary for the formation of such a propulsive jet is obtained by the nozzle-shaped reciprocating compressor pistons which are in cylinders with similar nozzle-shaped end or intermediate walls. By means of the reciprocating action of the nozzle-pistons the intermittently entering air, precompressed by ram, is further compressed, first in the volume in front of each piston and then in the volume behind each piston, expands through the centrally situated nozzle passages, and results in the creation of thrust.

In this known propulsion unit several nozzle-pistons are arranged in such a manner that the direction of reciprocation in all conditions is the same for all pistons. Balancing of inertia forces in such engines is obtained by means of an arrangement synchronizing the opposite motions of reciprocating piston units lying side by side.

The invention forming the basis of this application has the aim of creating, by means of further development of such jet propulsion units, the foundations necessary for high performance and efficient propulsion units having large thrusts and high efficiencies which, in contrast to gas-turbine units, possess the normal fuel consumptions of highly supercharged diesel internal combustion engines.

It is a further object of the present invention to provide a jet engine having substantially all the desirable characteristics of aircraft propulsion units, such as low specific weights, large concentration of power and small frontal area in volume, as well as a complete balance of internal inertia forces.

Still a further object of the present invention resides in the provision of means employing a system of coupling a free-piston engine with free-piston compressors by means of internally disposed coupling members so that the gas pressures of the free-piston engine is directly transformed into compression work.

Yet a further object of the present invention resides in the provision of means affording the cooling of a free-piston engine by disposing compressor elements radially about the engine pistons.

These together with various ancillary objects and features of the invention which will become apparent as the following description proceeds, are attained by this invention, a preferred embodiment of which being shown in the accompanying drawing by way of example only, wherein there is diagrammatically shown a side elevational view of a propulsive system in section which comprises a compressor unit coaxial with and surrounding an engine unit.

With continuing reference to the accompanying drawing, the jet engine disclosed by the present invention is generally indicated by numeral 10. This jet engine 10 includes an inner cylinder 12 having end walls 14 and 16. An outer cylinder 18 is concentrically disposed about the inner cylinder 12 and within a housing 20 of the jet engine 10.

A chamber 22 is defined between the inner cylinder 12 and the outer cylinder 20, which chamber is open at the end 24 to form a discharge nozzle for the jet engine. The chamber is closed at the other end thereof by means of a wall 26.

A pair of opposed pistons 28 and 30 are disposed in the inner cylinder 12 and are operable therein forming a central combustion chamber 32 between the opposed pistons 28 and 30, and end ccombustion chambers 34 and 36 between the opposed pistons 28 and 30 and the end walls 14 and 16, respectively.

Means for feeding fuel to the combustion chambers 32, 34, and 36 are provided and may be of any conventional construction such as fuel injection nozzles or the like, it being noted that the free-piston internal combustion engine unit contained within the inner cylinder 12 may be of a diesel type.

Disposed in the chamber 22 between the wall 26 and the wall 4 which has opening 24 therein, there are a pair of nozzle pistons 46 and 48 which are arcuate and nozzle-like in shape and which are concentrically disposed with respect to the pistons 28 and 30 and divide the chamber 22 into three variable compartments 50, 52, and 54.

The inner cylinder 12 has a plurality of slots as indicated at 56, 58, and 60, 62 therein, which slots are provided with closure members of any suitable construction such as conventional construction and which slots are respectively operated by the pistons 28 and 30 opening and closing the slots.

Connecting members 64 arranged radially about the piston 28 are connected thereto and extend through the slots 56, 58, and are attached to the nozzle piston 46. Likewise, connecting members 66 are radically connected to piston 30 and connected to the nozzle piston 48, whereby the nozzle pistons 46 and 48 are movable with the pistons 28 and 30, respectively.

Valve 70 establishes communication between the atmosphere and the compartment 52, while valves 72 and 74 establish communication between the atmosphere and compartments 50 and 54, respectively.

It is noted that the nozzle pistons 46 and 48 are so designed as to form exhaust passageways 76 and 78 between the walls of the nozzle pistons and the inner cylinder 12.

The engine unit within the inner cylinder 12 functions conventionally as a double-acting opposed-motion two-stroke diesel engine. The synchronization of the pistons 28 and 30 is effected by external synchronization of the fuel injecting valves 38, 40, and 42, or by any suitable well-known conventional means.

The engine unit may be started by means of compressed air employing conventional starting device (not shown). The pistons 28 and 30 are moved toward the middle dead center position whereby the air charge in the middle combustion chamber 32 is compressed. When the middle dead center position is reached, the compressed air introduced into chambers 34, 36 for starting exhausts through slots 56 and 62. Simultaneously an air charge is sucked into the chambers 52 and 54 through valves 70 and 74. At the middle dead center position fuel is injected into the center combustion chamber 32 through fuel injection valve 38 and combustion results from the high temperature of compression of the air charge within combustion chamber 32. This causes the two pistons 28 and 30 to be accelerated away from each other toward the outer dead center position. The air charge within the combustion chambers 32, 34 and 36 is then compressed and combustion takes place when the outer dead center positions are reached and fuel is injected through the injection nozzles 40 and 42.

A new air charge will simultaneously be delivered into the combustion chamber 32 through the slots 58 and 60 after passing through valve 72.

At the exhaust of the gases of combustion of combustion chamber 32 through the slots 58 and 60, such will be passed due to motion of the nozzle pistons 48 and 46 through the exhaust passages 76 and 78 and out of the discharge nozzle 24, in the direction indicated by the arrows as at 90, 92, and 94. These gases of combustion will combine with the air introduced in the direction indicated by the arrows 96, 98 between the baffle 100 and the outer housing 20.

Return strokes of the nozzle pistons 46 and 48 will cause the gases of combustion exhausting from the slots 56 and 62 to be further directed out of the discharge nozzle opening 24 in the direction indicated by arrows 90, 92, and 94.

Air introduced through the valves 70, 72, and 74 will pass through the slots in the inner cylinder 12 and into the combustion chambers to form an air charge for the next cycle of combustion therein and will be forced through the slots out of the passageways 76 and 78 and the discharge nozzle means 24 after combustion.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A combustion engine comprising an inner cylinder, an outer cylinder concentrically disposed about said inner cylinder, a chamber defined between said inner and outer cylinders and open at one end to form discharge nozzle means, said chamber being closed at the opposite end thereof, a pair of opposed pistons operable in said inner cylinder forming a central combustion chamber between said opposed pistons and end combustion chambers between the ends of said inner cylinder and said opposed pistons, means for feeding fuel to said combustion chambers to produce combustion therein, a pair of nozzle pistons disposed in said chamber concentrically with said opposed pistons and with both said cylinders, said nozzle pistons dividing said chamber into at least three variable compartments, said inner cylinder being defined by a wall provided with slots spaced from each other, said opposed pistons opening and closing said slots, respective connecting members attached to said opposed pistons and extending through said slots to said nozzle pistons and secured to the latter, a plurality of valves disposed in said outer cylinder and establishing communication between the atmosphere and each compartment, and exhaust passageways formed between said nozzle pistons and the wall of said inner cylinder and communicating with said nozzle means, whereby air introduced through said valves will pass through said slots and into said combustion chambers, to form an air charge for the next cycle of combustion therein and will be forced through said slots out of said passageways and said discharge nozzle means after combustion.

References Cited in the file of this patent

UNITED STATES PATENTS

| | | |
|---|---|---|
| 1,291,032 | Lesem | Jan. 14, 1919 |
| 1,741,731 | Nordensson | Dec. 31, 1929 |
| 2,018,779 | Endres | Oct. 29, 1935 |
| 2,438,134 | Spier | Mar. 23, 1948 |
| 2,442,470 | Pescara | June 1, 1948 |
| 2,466,255 | Mercier et al. | Apr. 5, 1949 |

FOREIGN PATENTS

| | | |
|---|---|---|
| 583,350 | France | Oct. 29, 1924 |
| 734,602 | Germany | Apr. 20, 1943 |
| 188,402 | Switzerland | Apr. 1, 1937 |